(12) United States Patent
Tian

(10) Patent No.: US 12,437,799 B2
(45) Date of Patent: Oct. 7, 2025

(54) MEMORY DEVICE AND ZQ CALIBRATION METHOD

(71) Applicant: CHANGXIN MEMORY TECHNOLOGIES, INC., Hefei (CN)

(72) Inventor: Kai Tian, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 146 days.

(21) Appl. No.: 18/448,902

(22) Filed: Aug. 11, 2023

(65) Prior Publication Data

US 2023/0420012 A1   Dec. 28, 2023

Related U.S. Application Data

(63) Continuation of application No. PCT/CN2022/123921, filed on Oct. 8, 2022.

(30) Foreign Application Priority Data

Jun. 22, 2022  (CN) .......................... 202210714288.3

(51) Int. Cl.
*G11C 11/4076* (2006.01)
*G11C 7/08* (2006.01)
*G11C 7/22* (2006.01)

(52) U.S. Cl.
CPC ............ *G11C 11/4076* (2013.01); *G11C 7/08* (2013.01); *G11C 7/22* (2013.01); *G11C 2207/2254* (2013.01)

(58) Field of Classification Search
CPC ............ G11C 7/109; G11C 7/1093; G11C 2207/2254; G11C 5/063; G11C 7/1084;
(Continued)

(56) References Cited

U.S. PATENT DOCUMENTS 9,665,462 B2 *  5/2017  Tatapudi ................. G11C 8/10
9,767,921 B1    9/2017  Pan
(Continued)

FOREIGN PATENT DOCUMENTS

CN   108133724 A   6/2018
CN   111863065 A   10/2020

OTHER PUBLICATIONS

International Search Report in the international application No. PCT/CN2022/123921, mailed on Dec. 16, 2022. 7 pages with English translation.
(Continued)

*Primary Examiner* — Jay W. Radke
(74) *Attorney, Agent, or Firm* — Syncoda LLC; Feng Ma

(57) ABSTRACT

A memory device includes: two calibration resistor interfaces connected to the same ZQ calibration resistor; and a first master chip, first slave chips, a second master chip, and second slave chips, which are commonly connected to the ZQ calibration resistor; in a command mode, a first signal receiver is used to receive a ZQ calibration command, a second signal receiver is used to receive and delay the ZQ calibration command, each of the first slave chips and the second slave chips starts to calibrate based on a respective ZQ flag signal, and in response to a respective ZQ calibration is completed, each of the first slave chips and the second slave chips sends a respective ZQ flag signal through second transmission terminals.

17 Claims, 12 Drawing Sheets

(58) Field of Classification Search
CPC .......... G11C 11/4078; G11C 11/4093; G11C 29/028; G11C 29/50; G11C 29/50008; H03K 19/01742; H01L 23/64
See application file for complete search history.

(56) References Cited

U.S. PATENT DOCUMENTS

| | | |
|---|---|---|
| 10,276,220 B2 | 4/2019 | Jeon |
| 2014/0167281 A1 | 6/2014 | Byeon |
| 2016/0012865 A1 | 1/2016 | Lee |
| 2017/0109249 A1* | 4/2017 | Tatapudi .............. G11C 29/025 |
| 2017/0301388 A1 | 10/2017 | Lee |
| 2018/0158495 A1 | 6/2018 | Jeon |
| 2018/0190368 A1 | 7/2018 | Pan |
| 2019/0052268 A1 | 2/2019 | Lee et al. |
| 2019/0355407 A1 | 11/2019 | Lee |
| 2020/0066323 A1 | 2/2020 | Lee |
| 2020/0143867 A1 | 5/2020 | Lee |
| 2021/0210132 A1 | 7/2021 | Lee |
| 2022/0358987 A1 | 11/2022 | Lee |
| 2023/0420008 A1* | 12/2023 | Tian .................... G11C 7/1084 |
| 2023/0420009 A1* | 12/2023 | Tian .................... G11C 29/022 |
| 2024/0096409 A1* | 3/2024 | Tian .................... G11C 11/4093 |

OTHER PUBLICATIONS

Extended European Search Report in application No. 22924580, mailed on May 23, 2024.

* cited by examiner

MEMORY DEVICE AND ZQ CALIBRATION METHOD

CROSS-REFERENCE TO RELATED APPLICATIONS

This is a continuation of International Application No. PCT/CN2022/123921 filed on Oct. 8, 2022, which claims priority to Chinese patent application No. 202210714288.3 filed on Jun. 22, 2022. The disclosures of the above referenced applications are hereby incorporated by reference in their entirety.

BACKGROUND

ZQ calibration is an extremely important function in a Dynamic Random Access Memory (DRAM). It is specifically related to whether the output impedance of an output port is accurate or not and whether the termination resistance of an input port is accurate or not. The deviation of these parameters will cause severe distortion of signals due to impedance mismatch during transmission, and the higher the frequency of the signals, the greater the impact of distortion on the signals.

The number of ZQ calibration resistors required for LPDDR5 has been specified in the package definition of the JEDEC standards. For example, there is one ZQ calibration resistor for a first type of chip, and two ZQ calibration resistors for a second type of chip. It can be seen that the number of ZQ calibration resistors in LPDDR5 is significantly less than the number of ZQ calibration resistors in LPDDR4.

With the increasing demand for LPDDR capacity, more and more chips will be placed in one LPDDR package, and each chip requires separate ZQ calibration due to individual differences. Especially for LPDDR5 packages, the number of ZQ calibration resistors is significantly less than the number of ZQ calibration resistors in LPDDR4, and more chips are required to share one ZQ. How to achieve ZQ calibration by sharing ZQ calibration resistors among multiple chips is an urgent technical problem to be solved currently.

SUMMARY

The present disclosure relates but is not limited to a memory device and a ZQ calibration method.

The following is a summary of the subject matter described in detail in the present disclosure. This summary is not intended to limit the scope of protection of the claims.

The present disclosure provides a memory device and a ZQ calibration method.

A first aspect of the present disclosure provides a memory device. The memory device comprises: two calibration resistor interfaces, the two calibration resistor interfaces being connected to a same ZQ calibration resistor; and a first master chip, a plurality of stages of cascaded first slave chips, a second master chip, and a plurality of stages of cascaded second slave chips, which are commonly connected to the ZQ calibration resistor; wherein each of the first master chip, the first slave chips, the second master chip, and the second slave chips is provided with a first transmission terminal and a second transmission terminal, and each of the second transmission terminals are used to transmit a ZQ flag signal, and wherein the second transmission terminal of the first master chip is connected to the first transmission terminal of a first slave chip of a first stage of the plurality of stages of cascaded first slave chips, a second transmission terminal of a first slave chip of each stage of the plurality of stages of cascaded first slave chips is connected to a first transmission terminal of a first slave chip of a next stage of the plurality of stages of cascaded first slave chips, the second transmission terminal of the second master chip is connected to the first transmission terminal of a second slave chip of a first stage of the plurality of stages of cascaded second slave chips, and a second transmission terminal of a second slave chip of each stage of the plurality of stages of cascaded second slave chips is connected to a first transmission terminal of a second slave chip of a next stage of the plurality of stages of cascaded second slave chips; the first master chip is provided with a first signal receiver, the second master chip is provided with a second signal receiver, and each of the first slave chips and the second slave chips is provided with a respective third signal receiver; in a command mode, the first signal receiver is used to receive, at a first ZQ signal terminal, a ZQ calibration command provided by a memory, the second signal receiver is used to receive and delay the ZQ calibration command by a second ZQ signal terminal, the first master chip and the second master chip start to calibrate based on the ZQ calibration command, and the first master chip and the second master chip send their respective ZQ flag signals by their second transmission terminals in response to the calibration of the first and second master chips being completed, respectively, the respective ZQ flag signal indicating that a chip has been calibrated with the calibration resistor; and the third signal receiver of each of the first and second slave chips is used to receive a respective ZQ flag signal at its first transmission terminal, each of the first slave chips and the second slave chips starts to calibrate based on the respective ZQ flag signal, and each of the first slave chips and the second slave chips sends a respective ZQ flag signal by its respective second transmission terminals in response to a respective ZQ calibration operation being completed until all the first or second slave chips have been calibrated.

An embodiment of the present disclosure also provides a ZQ calibration method, which is applied to the memory device provided in the above embodiment. The ZQ calibration method comprises: obtaining, in a command mode, a ZQ calibration command externally applied to the memory device; in response to the ZQ calibration command, performing a first type of calibration operation on a first master chip; after the first type of calibration operation is completed, transmitting a type of ZQ flag signal to a first slave chip of a first stage of a plurality of stages of cascaded first slave chips, and at a same time, performing a second type of calibration operation on the first master chip; in response to the type of ZQ flag signal, performing the first type of calibration operation on the first slave chip of the first stage of the plurality of stages of cascaded first slave chips; after the first type of calibration operation on the first slave chip of the first stage is completed, transmitting the type of ZQ flag signal to a first slave chip of a next stage of the plurality of stages of cascaded first slave chips, and at a same time, performing the second type of calibration operation on the first slave chip of the first stage of the plurality of stages of cascaded first slave chips, until the first type of calibration operation of a first slave chip of a last stage of the plurality of stages of cascaded first slave chips is completed; completing the second type of calibration operation on the first slave chip of the last stage of the plurality of stages of cascaded first slave chips; in response to a delayed the ZQ calibration command, performing the first type of calibration operation on a second master chip; after the first type of calibration operation is completed, transmitting the type of ZQ flag signal to a second slave chip of a first stage of the plurality of stages of cascaded second slave chips, and at a same time, performing the second type of calibration operation on the second master chip; in response to the type of ZQ flag signal, performing the first type of calibration operation on the second slave chip of the first stage of the plurality of stages of cascaded second slave chips; after the first type of calibration operation on the second slave chip of the first stage is completed, transmitting the type of ZQ flag signal to a second slave chip of a next stage of the plurality of stages of cascaded second slave chips, and at a same time, performing the second type of calibration operation on the second slave chip of the first stage of the plurality of stages of cascaded second slave chips, until the first type of calibration operation of a second slave chip of a last stage of the plurality of stages of cascaded second slave chips is completed; completing the second type of calibration operation on the second slave chip of the last stage of the plurality of stages of cascaded second slave chips.

In a memory device and a ZQ calibration method provided in embodiments of the present disclosure, a plurality of chips calibrated through a first calibration interface are configured as a first master chip and a plurality of first slave chips; a plurality of chips calibrated through a second calibration interface are configured as a second master chip and a plurality of second slave chips; the first master chip uses a calibration resistor to perform ZQ calibration on the basis of a ZQ calibration command provided by a memory, and the second master chip uses the calibration resistor to perform ZQ calibration after a certain delay on the basis of the ZQ calibration command provided by the memory; after the first master chip and the second master chip have used the calibration resistor to perform ZQ calibration, they send a respective ZQ flag signal to the cascaded first slave chips and second slave chips, and the cascaded first slave chips and second slave chips sequentially use the ZQ calibration resistor to perform ZQ calibration on the basis of the ZQ flag signal.

After reading and understanding the drawings and detailed description, other aspects may be apparent.

BRIEF DESCRIPTION OF THE DRAWINGS

The drawings, which are incorporated into and constitute a part of the specification, illustrate embodiments of the present disclosure and, together with the description, serve to explain the principles of the embodiments of the present disclosure. In the figures, like reference signs are used to denote like elements. The figures in the description below are some embodiments of the present disclosure, rather than all embodiments. For a person skilled in the art, other figures may be obtained according to these figures without involving inventive skill.

DETAILED DESCRIPTION

The technical solutions in the embodiments of the present disclosure will clearly and completely described below with reference to the drawings in the embodiments of the present disclosure. Evidently, the described embodiments are part of the embodiments of the present disclosure, rather than all of the embodiments. All other embodiments that are obtained by a person of ordinary skill in the art on the basis of the embodiments in the present disclosure without involving inventive skill belong to the scope of protection of the present disclosure. It should be noted that the embodiments and the features in embodiments in the present disclosure may be combined arbitrarily with each other without conflict.

It can be known from the background that with the increasing demand for LPDDR capacity, more and more chips will be placed in one LPDDR package, and each chip requires separate ZQ calibration due to individual differences. Especially for LPDDR5 packages, the number of ZQ calibration resistors is significantly less than the number of ZQ calibration resistors in LPDDR4, and more chips are required to share one ZQ.

An embodiment of the present disclosure provides a memory device, wherein by designing a new control circuit, a theoretically unlimited number of chips share a ZQ calibration resistor.

Figure 1:
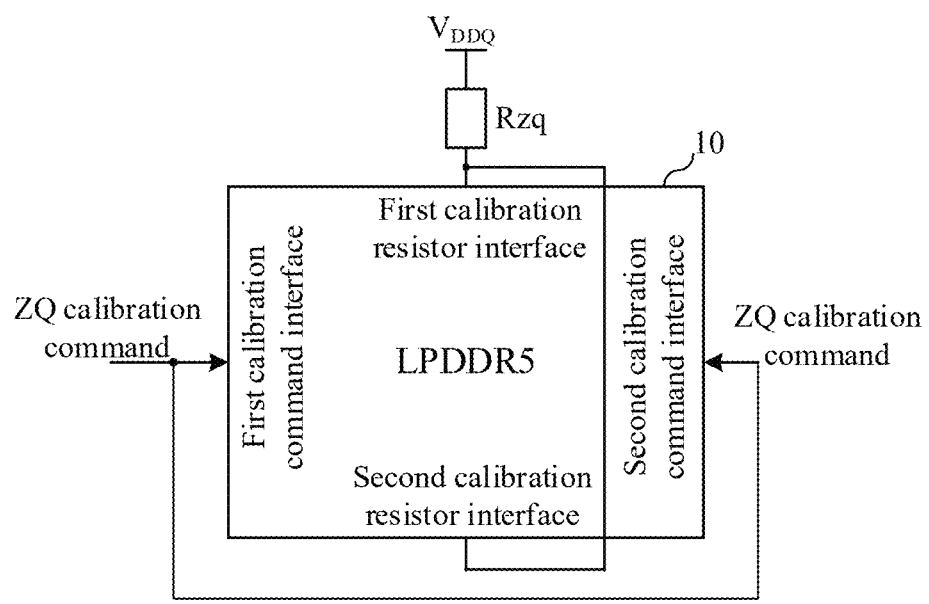
FIG. 1 is a schematic diagram for reception of two calibration resistor interfaces being connected to the same ZQ calibration resistor provided in an embodiment of the present disclosure.
Figure 6:
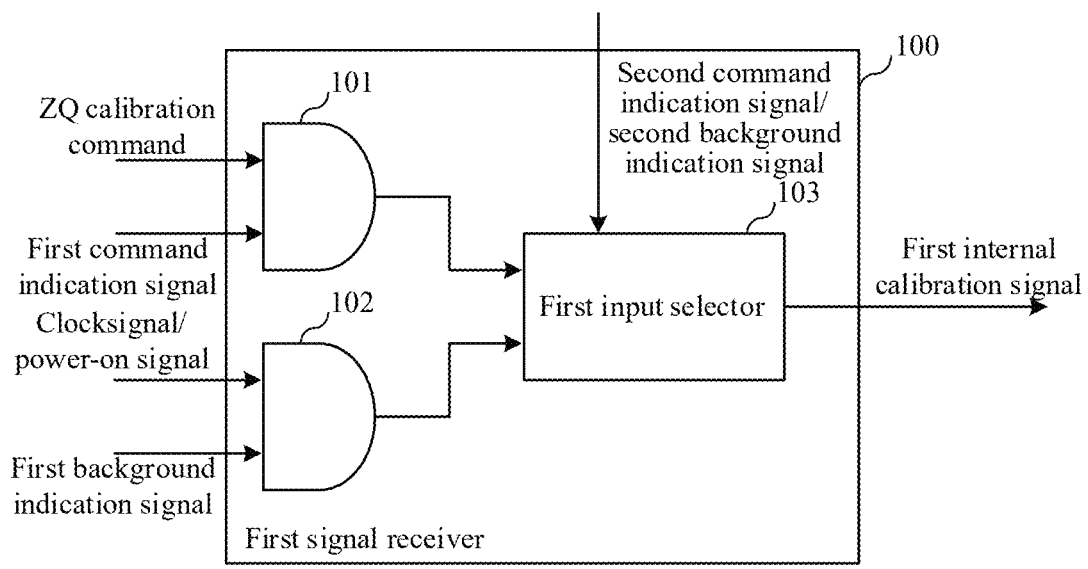
FIG. 6 is a schematic structural diagram of a first signal receiver provided in the embodiment of the present disclosure.
Figure 7:
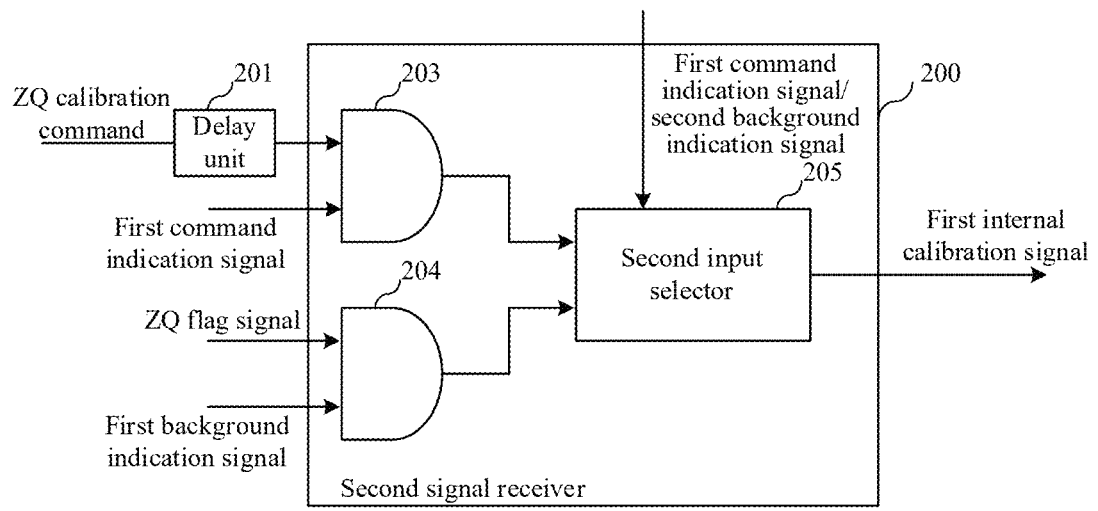
FIG. 7 is a schematic structural diagram of a second signal receiver provided in the embodiment of the present disclosure.
Figure 8:
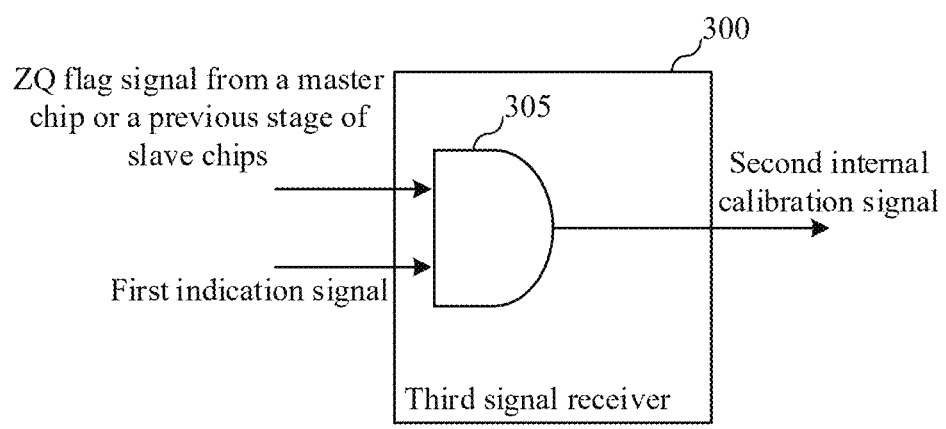
FIG. 8 is a schematic structural diagram of a third signal receiver provided in the embodiment of the present disclosure.
Figure 9:
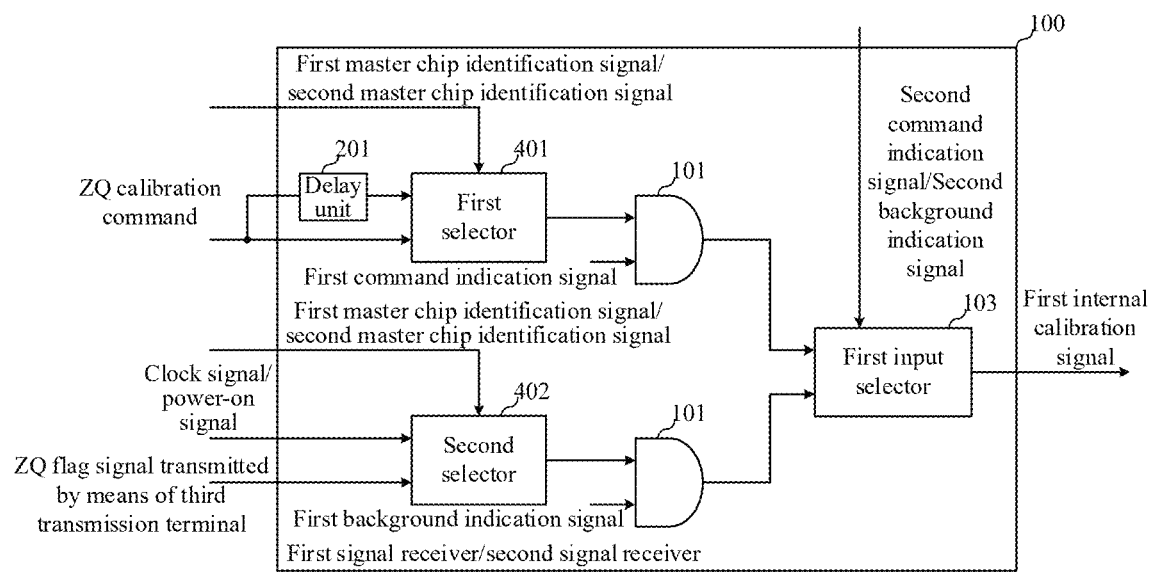
FIG. 9 is a schematic structural diagram of a first signal receiver and a second signal receiver provided in the embodiment of the present disclosure when they have the same structure.
Figure 10:
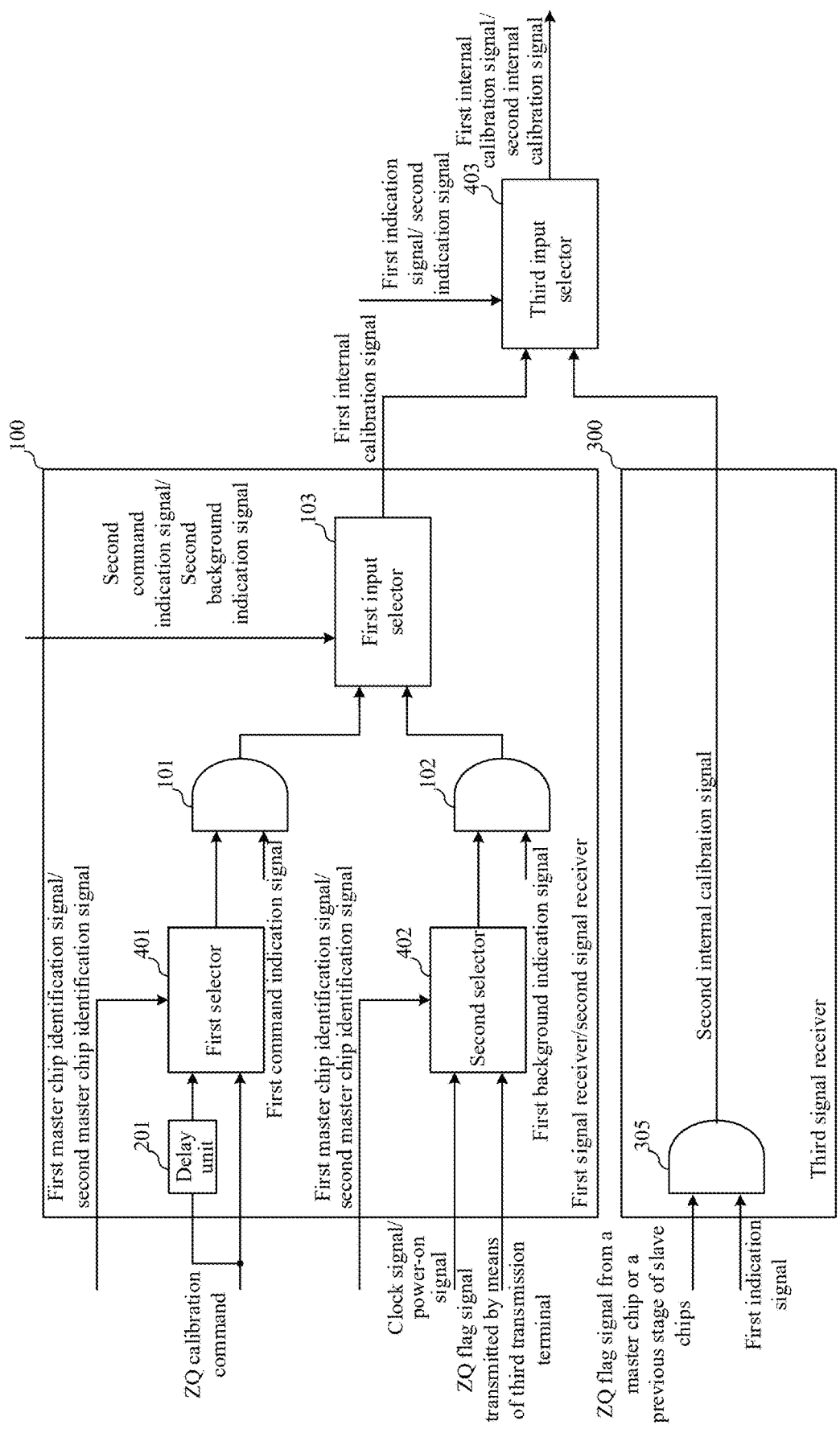
FIG. 10 is a schematic structural diagram of a first signal receiver and a third signal receiver provided in the embodiment of the present disclosure when they are integrated.

FIG. 1 is a schematic diagram for reception of two calibration resistor interfaces being connected to the same ZQ calibration resistor provided in this embodiment; FIGS. 2 to 5 are schematic structural diagrams of a memory device provided in this embodiment in different connection modes; FIG. 6 is a schematic structural diagram of a first signal receiver provided in this embodiment; FIG. 7 is a schematic structural diagram of a second signal receiver provided in this embodiment; FIG. 8 is a schematic structural diagram of a third signal receiver provided in this embodiment; FIG. 9 is a schematic structural diagram of a first signal receiver and a second signal receiver provided in this embodiment when they have the same structure; and FIG. 10 is a schematic structural diagram of a first signal receiver and a third signal receiver provided in this embodiment of the present disclosure when they are integrated. The structure of the memory device provided in this embodiment will described in detail below with reference to the figures, which is specifically as follows:

The memory device comprises two calibration resistor interfaces. The two calibration resistor interfaces being connected to the same ZQ calibration resistor.

Referring to FIG. 1, the memory device is a LPDDR5 memory device 10, and the LPDDR5 memory device 10 comprises a first calibration resistor interface, a second calibration resistor interface, a first calibration command interface, and a second calibration command interface. A calibration command received by the first calibration command interface is calibrated through a calibration resistor connected to the first calibration resistor interface, and a calibration command received by the second calibration command interface is calibrated through the calibration resistor connected to the second calibration resistor interface. In this embodiment, the first calibration resistor interface and the second calibration resistor interface are commonly connected to the same ZQ calibration resistor Rzq. Accordingly, the first calibration command interface and the second calibration command interface perform calibration by means of the ZQ calibration resistor Rzq on the basis of a ZQ calibration command.

Referring to FIGS. 2 to 5, the memory device further comprises a first master chip, a plurality of stages of cascaded first slave chips, a second master chip, and a plurality of stages of cascaded second slave chips, which are commonly connected to the ZQ calibration resistor.

Each of the first master chip, the first slave chips, the second master chip, and the second slave chips is provided with a first transmission terminals A and a second transmission terminals B. Each of the first transmission terminals A and the second transmission terminals B is used to transmit a ZQ flag signal, wherein each of the first transmission terminal A is used to receive a ZQ flag signal and each of the second transmission terminal B is used to send a ZQ flag signal. All the ZQ flag signals are of the same type.

It should be noted that the term "cascaded" mentioned above means that: a plurality of first slave chips are used as a first slave chip of a first stage, a first slave chip of a second stage, . . . , a first slave chip of an (M−1)th stage and a first slave chip of an Mth stage which are connected end to end, respectively; and a plurality of second slave chips are used as a second slave chip of a first stage, a second slave chip of a second stage, . . . , a second slave chip of a (K−1)th stage and a second slave chip of a Kth stage which are connected end to end, respectively. The second transmission terminal B of the first master chip is connected to the first transmission terminal A of the first slave chip of the first stage, and the second transmission terminal B of the first slave chip of each stage is connected to the first transmission terminal A of the first slave chip of a next stage; the second transmission terminal B of the second master chip is connected to the first transmission terminal A of the second slave chip of a first stage, and the second transmission terminal B of the second slave chip of each stage is connected to the first transmission terminal A of the second slave chip of a next stage.

The first master chip is provided with a first signal receiver, the second master chip is provided with a second signal receiver, and each of the first slave chips and the second slave chips is provided with a respective third signal receiver.

In a command mode, the first signal receiver is used to receive a ZQ calibration command provided by a memory by means of a first ZQ signal terminal, the second signal receiver is used to receive and delay the ZQ calibration command by means of a second ZQ signal terminal, the first master chip and the second master chip start to calibrate on the basis of the ZQ calibration command, and after the calibration is completed, the first master chip and the second master chip send their respective ZQ flag signal by means of their second transmission terminals B, the respective ZQ flag signal indicating that a chip has been calibrated with the calibration resistor; and the third signal receiver of each of the first and second slave chips is used to receive a respective ZQ flag signal by means of the first transmission terminal A, each of the first slave chips and the second slave chips starts to calibrate on the basis of the respective ZQ flag signal, and after the calibration is completed, each of the first slave chips and the second slave chips sends a respective ZQ flag signal by means of its respective second transmission terminals B until all the first or second slave chips are calibrated.

In the memory device provided in this embodiment, a plurality of chips calibrated by means of the first calibration interface are configured as a first master chip and a plurality of first slave chips; a plurality of chips calibrated by means of a second calibration interface are configured as a second master chip and a plurality of second slave chips; the first master chip uses a calibration resistor to perform ZQ calibration on the basis of a ZQ calibration command provided by a memory, and the second master chip uses the calibration resistor to perform ZQ calibration after a certain delay on the basis of the ZQ calibration command provided by the memory; after the first master chip and the second master chip use the calibration resistor to perform ZQ calibration, they send a ZQ flag signal to the cascaded first slave chips and the second slave chips, and the cascaded first slave chips and the second slave chips sequentially use the ZQ calibration resistor to perform ZQ calibration on the basis of the ZQ flag signal, so that a theoretically unlimited number of chips share the ZQ calibration resistor for ZQ calibration.

It should be noted that for the "delay" mentioned above, in some embodiments, the delay is to delay half of a calibration period. That is, in the first half of the calibration period, the first master chip and the first slave chip are calibrated on the basis of the ZQ calibration resistor, and in the second half of the calibration period, the second master chip, and the second slave chips are calibrated on the basis of the ZQ calibration resistor. The specific size of the "delay" may be defined on the basis of the number of chips. The number of chips includes the number of chip sets and the total number of master and slave chips in the same chip set. This embodiment does not constitute a limitation on the specific delay time.

For the first master chip, the first slave chips, the second master chip, and the second slave chips shown in FIGS. 2 to 5, they are used to reset the chips according to a reset signal, to select a target chip to be enabled according to a strobe signal, and to complete writing or reading of data according to a clock signal and a data signal. It should be noted that the reset signal, the data signal, the clock signal, and the strobe signal shown in FIGS. 2 to 5 are used to reflect the working diagrams of the first master chip, the first slave chips, the second master chip, and the second slave chips, and do not constitute a limitation on the structure of the memory device.

Referring to FIGS. 2 to 5, in some embodiments, the second transmission terminal B of the first slave chip of the last stage of the plurality of stages of cascaded first slave chips is connected to the first transmission terminal A of the first master chip; and the second transmission terminal B of the second slave chip of the last stage of the plurality of stages of cascaded second slave chips is connected to the first transmission terminal A of the second master chip. When the first master chip receives a ZQ flag signal, it is demonstrated that all the first slave chips have completed ZQ calibration; and when the second master chip receives a ZQ flag signal, it is demonstrated that all the second slave chips have completed ZQ calibration, the memory may perform a next operation.

Figure 4:
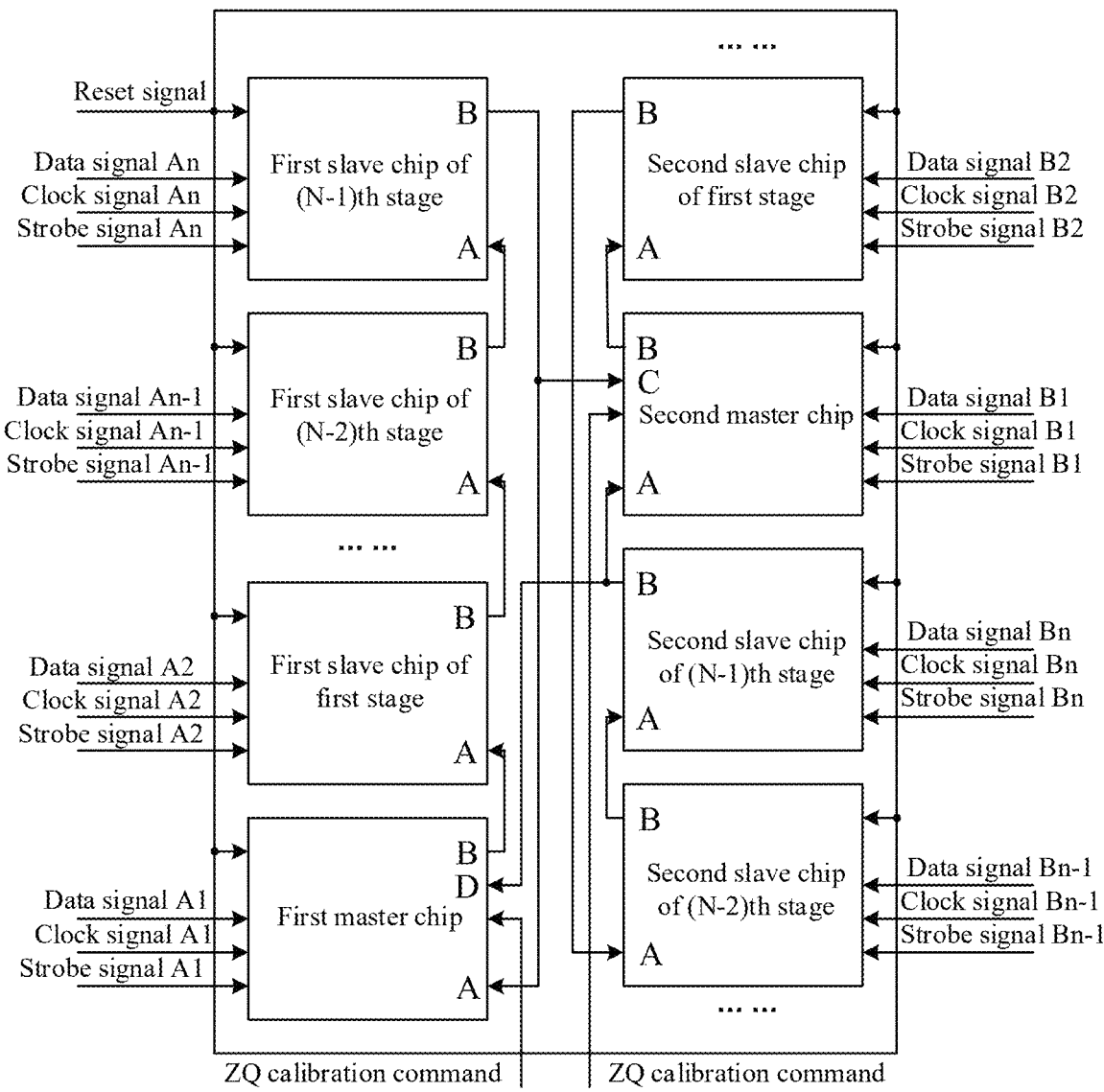
FIG. 4 is a third schematic structural diagram of a memory device provided in an embodiment of the present disclosure in different connection modes.
Figure 5:
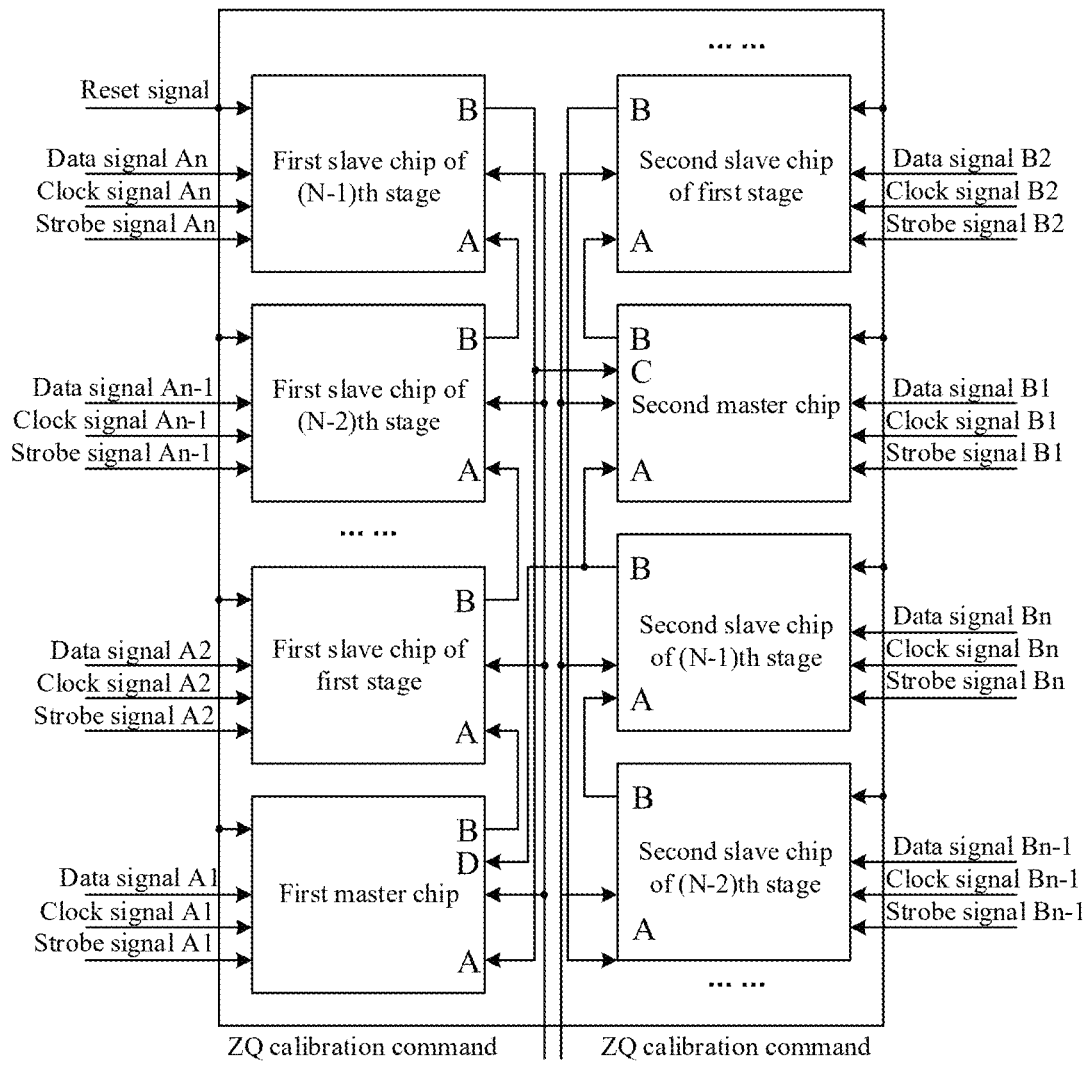
FIG. 5 is a fourth schematic structural diagram of a memory device provided in an embodiment of the present disclosure in different connection modes.

Referring to FIGS. 4 and 5, in some embodiments, the second master chip further includes a third transmission terminal C. The third transmission terminal C is turned on in a background mode for receiving a ZQ flag signal. The third transmission terminal C is used to receive the ZQ flag signal sent by the first slave chip of the last stage. In the background mode, the second master chip starts to calibrate on the basis of the ZQ flag signal.

In the background mode, the first signal receiver is used to receive, by means of the first ZQ signal terminal, a clock signal or a power-on signal provided by a memory. The first master chip starts to calibrate on the basis of the clock signal or the power-on signal. After the first master chip completes the calibration, it sends the respective ZQ flag signal by means of the second transmission terminal. The first slave chips, the second master chip, and the second slave chips sequentially start to calibrate on the basis of a respective ZQ flag signal. After the first master chip completes the ZQ calibration, it sends a respective ZQ flag signal to the first slave chip of the first stage of the plurality of stages of cascaded first slave chips by means of the second transmission terminal B; a ZQ flag signal sent by the first slave chip of the last stage of the plurality of stages of cascaded first slave chips after completing the ZQ calibration is received by the second master chip by means of the third transmission terminal C; the second master chip performs calibration on the basis of the ZQ flag signal; and after the second master chip completes the ZQ calibration, it sends a ZQ flag signal to the second slave chip of the first stage of the plurality of stages of cascaded second slave chips by means of the second transmission terminal B, until the second slave chip of the last stage of the plurality of stages of cascaded second slave chips completes ZQ calibration.

In some embodiments, the first master chip further includes a fourth transmission terminal D. The fourth transmission terminal D is turned on in the background mode for transmitting a ZQ flag signal. The fourth transmission terminal is connected to the second transmission terminal B of the second slave chip of the last stage of the plurality of stages of cascaded second slave chips. When the first master chip receives a ZQ flag signal, it is demonstrated that all slave chips have completed ZQ calibration in the background mode, and the memory may perform a next operation. It should be noted that in the command mode, the first master chip receives the ZQ flag signal sent by the first slave chip of the last stage of the plurality of stages of cascaded first slave chips by means of the first transmission terminal; and in the background mode, the first master chip receives the ZQ flag signal sent by the second slave chip of the last stage by means of the fourth transmission terminal.

Figure 2:
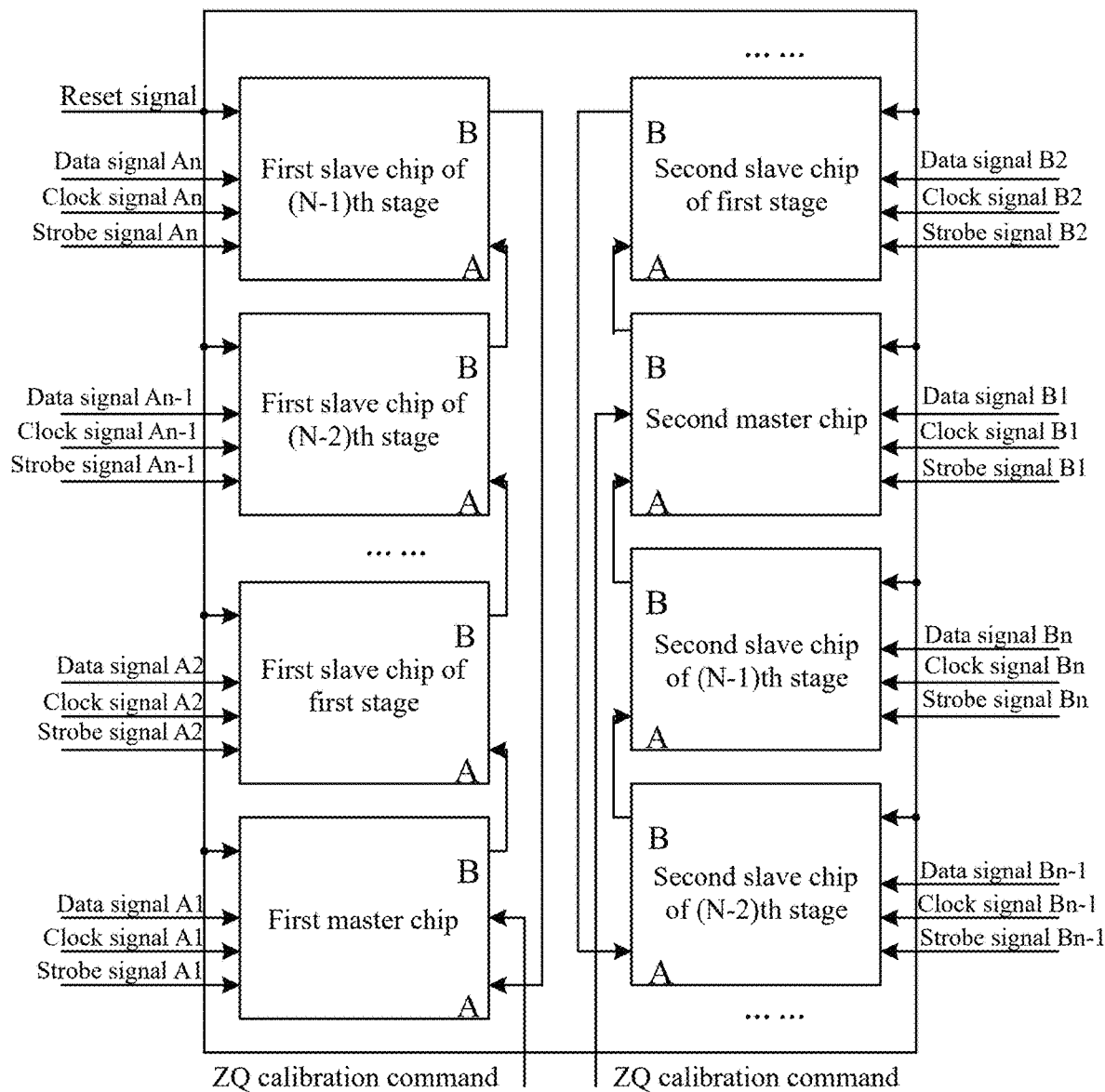
FIG. 2 is a first schematic structural diagram of a memory device provided in an embodiment of the present disclosure in different connection modes.

In some embodiments, referring to FIGS. 2 and 4 in combination with FIG. 6, the first signal receiver 100 includes: a first AND gate 101, one input terminal of which is used to receive the ZQ calibration command, and the other input terminal of which is used to receive a first command indication signal for indicating that the memory is working in the command mode; a second AND gate 102, one input terminal of which is used to receive a clock signal or a power-on signal, and the other input terminal of which is used to receive a first background indication signal for indicating that the memory is working in the background mode; and a first input selector 103, a first input terminal of which is connected to an output terminal of the first AND gate 101, a second input terminal of which is connected to an output terminal of the second AND gate 102, a first selection terminal of which is used to receive a second command indication signal or a second background indication signal, and a first output terminal of which is used to output a first internal calibration signal for instructing the first master chip and the second master chip to perform calibration. The first input selector 103 is configured to connect the first input terminal to the first output terminal on the basis of the second command indication signal, or to connect the second input terminal to the first output terminal on the basis of the second background indication signal;

It should be noted that for the command mode and background mode mentioned in this embodiment, the memory is started on the basis of a preset command in the command mode, and the memory is started on the basis of the memory's internal self-contained signal in the background mode, the internal self-contained signal including a power-on signal and a clock signal.

Referring to FIG. 2 in combination with FIG. 6, when the memory is in the command mode, a second command indication signal is supplied to the first signal receiver 100 of the first main chip, and the first input selector 103 connects the first input terminal to the first output terminal on the basis of the second command indication signal. At this time, the first signal receiver 100 provides a first internal calibration signal on the basis of the output of the first AND gate 101, that is, when the first signal receiver 100 receives the ZQ calibration command, it generates the first internal calibration signal, thereby controlling the first master chip to perform ZQ calibration. Referring to FIG. 4 in combination with FIG. 6, when the memory is in the background mode, a second background indication signal is supplied to the first signal receiver 100 of the first master chip, and the first input selector 103 connects the second input terminal to the first output terminal on the basis of the second background indication signal. At this time, the first signal receiver 100 provides a first internal calibration signal on the basis of the output of the second AND gate 102, that is, when the first signal receiver 100 receives the clock signal or the power-on signal, it generates the first internal calibration signal, thereby controlling the first main chip to perform ZQ calibration.

In some embodiments, referring to FIGS. 2 and 4 in combination with FIG. 7, the second signal receiver 200 includes: a third AND gate 203, one input terminal of which is used to receive and delay the ZQ calibration command, and the other input terminal of which is used to receive the first command indication signal; a fourth AND gate 204, one input terminal of which is used to receive the ZQ flag signal, and the other input terminal of which is used to receive the first background indication signal; and a second input selector 205, a third input terminal of which is connected to an output terminal of the third AND gate 203, a fourth input terminal of which is connected to an output terminal of the fourth AND gate 204, a second selection terminal of which is used to receive the second command indication signal or the second background indication signal, and a second output terminal of which is used to output the first internal calibration signal. The second input selector 205 is configured to connect the third input terminal to the second output terminal on the basis of the second command indication signal, or to connect the fourth input terminal to the second output terminal on the basis of the second background indication signal.

Referring to FIG. 7, in some embodiments, the memory device further comprises a delay unit 201 for delaying the ZQ calibration signal received by the second signal receiver 200.

Referring to FIG. 2 in combination with FIG. 7, when the memory is in the command mode, a second command indication signal is supplied to the second signal receiver 200 of the second main chip, and the second input selector 205 connects the third input terminal to the second output terminal on the basis of the second command indication signal. At this time, the second signal receiver 200 provides a first internal calibration signal on the basis of the output of the third AND gate 203, that is, when the second signal receiver 200 receives the delayed ZQ calibration command, it generates the first internal calibration signal, thereby controlling the second master chip to perform ZQ calibration. Referring to FIG. 4 in combination with FIG. 7, when the memory is in the background mode, a second background indication signal is supplied to the second signal receiver 200 of the second main chip, and the second input selector 205 connects the fourth input terminal to the second output terminal on the basis of the second background indication signal. At this time, the second signal receiver 200 provides a first internal calibration signal on the basis of the output of the fourth AND gate 204, that is, when the second signal receiver 200 receives the ZQ flag signal, it generates the first internal calibration signal, thereby controlling the second master chip to perform ZQ calibration.

In some embodiments, referring to FIG. 8, the third signal receiver 300 includes a fifth AND gate 305, one input terminal of which is used to receive the ZQ flag signal, the other input terminal of which is used to receive a first indication signal for indicating that a current chip is the slave chip, and an output terminal of which is used to output a second internal calibration signal for instructing the first slave chip and the second slave chip to perform calibration.

The third signal receivers 300 are arranged in the first slave chips and the second slave chips. The third signal receiver 300 continuously receives the first indication signal so that the second internal calibration signal can be generated when the third signal receiver 300 receives the ZQ flag signal, thereby controlling the first slave chips and the second slave chips to perform ZQ calibration.

In some embodiments, the first signal receiver 100 and the second signal receiver 200 have the same structure, that is, the receivers arranged in the first master chip and the second master chip have the same structure. Referring to FIG. 9, the first signal receiver 100 and the second signal receiver 200 include: a first selector 401, one input terminal of which is used to receive the ZQ calibration command, the other input terminal of which is used to receive a delayed ZQ calibration command, and a selection terminal of which is used to receive a first master chip identification signal or a second master chip identification signal; wherein the first selector 401 is configured to output the ZQ calibration command on the basis of the first master chip identification signal, or to output the delayed ZQ calibration command on the basis of the second master chip identification signal; a first AND gate 101, one input terminal of which is connected to an output terminal of the first selector 401, and the other input terminal of which is used to receive a first command indication signal for indicating that the memory is working in the command mode; a second selector 402, one input terminal of which is used to receive a clock signal or a power-on signal, the other input terminal of which is used to receive the ZQ flag signal transmitted by means of the third transmission terminal, and a selection terminal of which is used to receive the first master chip identification signal or the second master chip identification signal; wherein the second selector 402 is configured to output the clock signal or the power-on signal on the basis of the first master chip identification signal, or to output the ZQ flag signal on the basis of the second master chip identification signal; a second AND gate 102, one input terminal of which is connected to an output terminal of the second selector 402, and the other input terminal of which is used to receive a first background indication signal for indicating that the memory is working in the background mode; a first input selector 103, a first input terminal of which is connected to an output terminal of the first AND gate 101, a second input terminal of which is connected to an output terminal of the second AND gate 102, a first selection terminal of which is used to receive a second command indication signal or a second background indication signal, and a first output terminal of which is used to output a first internal calibration signal for instructing the first master chip and the second master chip to perform calibration; wherein the first input selector 103 is configured to connect the first input terminal to the first output terminal on the basis of the second command indication signal, or to connect the second input terminal to the first output terminal on the basis of the second background indication signal;

If the first signal receiver 100 receives the first master chip identification signal, after conduction is selected by the first selector 401 and the second selector 402, the circuit principle of the first signal receiver 100 is the same as that in FIG. 6; and if the first signal receiver 100 receives the second master chip identification signal, after the conduction is selected by the first selector 401 and the second selector 402, the circuit principle of the first signal receiver 100 is the same as that in FIG. 7.

In some embodiments, the ZQ calibration command is delayed by the delay unit 201, the delay unit 201 may consist of an even number of inverters. The structure of the delay unit 201 is not defined in the present disclosure.

Figure 3:
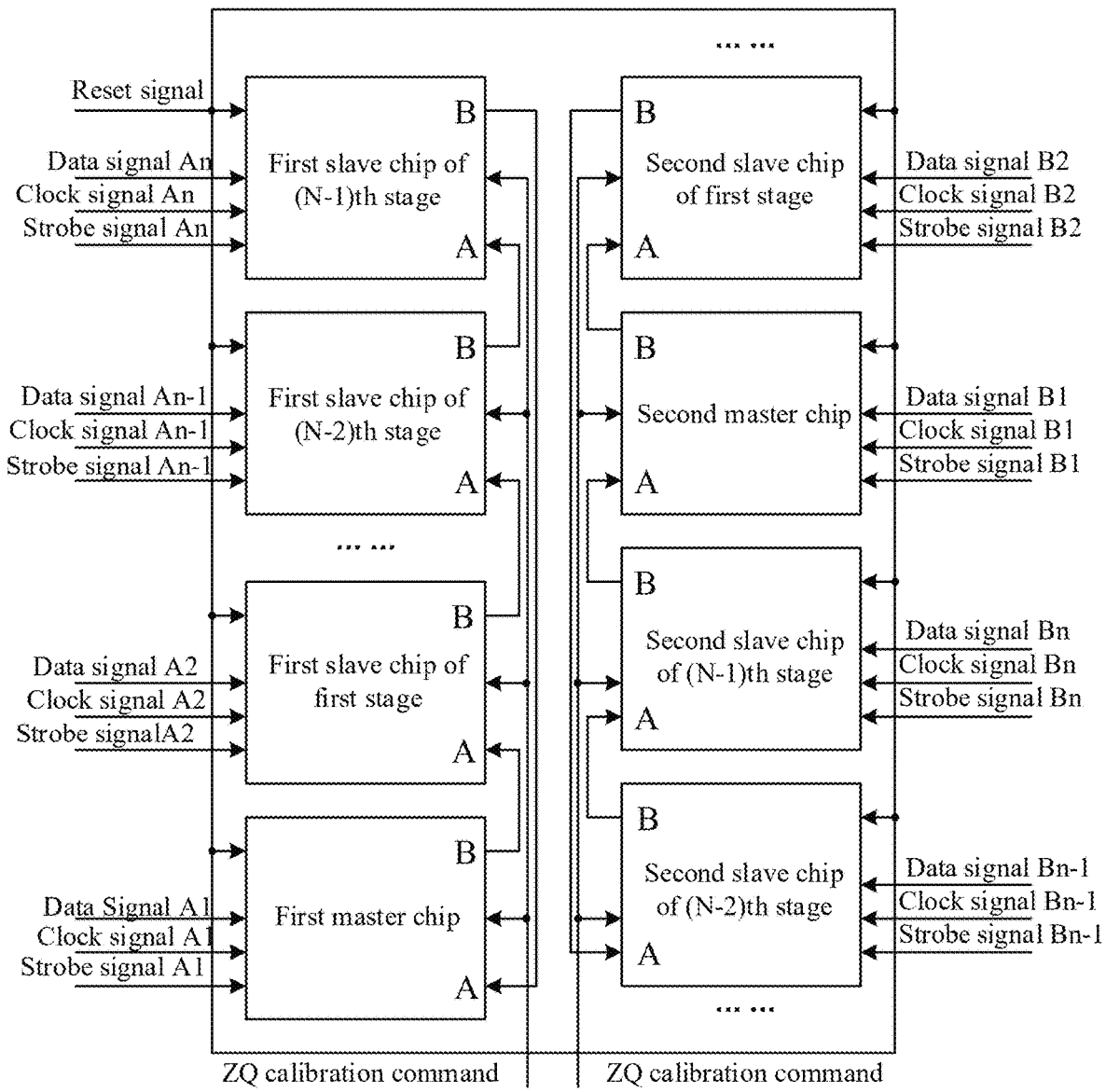
FIG. 3 is a second schematic structural diagram of a memory device provided in an embodiment of the present disclosure in different connection modes.

In the memory device structures shown in FIGS. 2 and 4, only the first master chip and the second master chip receive the ZQ calibration command, and there are differences in the structures of the first master chip, the first slave chips, the second master chip, and the second slave chips. Referring to FIGS. 3 and 5, in some embodiments, the first master chip, the first slave chips, the second master chip, and the second slave chips have the same structure. At this time, the first slave chips and the second slave chips also need to receive the ZQ calibration command. At this time, the first master chip and the second master chip also include the third signal receiver 300, and the first slave chips and the second slave chips also include the first signal receiver 100 and/or second signal receiver 200.

Referring to FIG. 10, the first master chip, the first slave chips, the second master chip, and the second slave chips further include: a third input selector 403, a fifth input terminal of which is used to receive the first internal calibration command, a sixth input terminal of which is used to receive the second internal calibration command, a third selection terminal of which is used to receive the first indication signal or a second indication signal, the second indication signal being used for indicating that a current chip is the first master chip or the second master chip, and a third output terminal of which is used to output the first internal calibration command or the second internal calibration command. The third input selector 403 is configured to connect the sixth input terminal to the third output terminal on the basis of the first indication signal, or to connect the fifth input terminal to the third output terminal on the basis of the second indication signal.

The third input selector 403 selects an output on the basis of the first indication signal and the second indication signal. When the second indication signal is received, it is demonstrated that the current chip is the first master chip or the second master chip, and the third input selector 403 selects an output signal of the first signal receiver 100 or the second signal receiver 200 for output. When the second indication signal is received, it is demonstrated that the current chip is the first slave chip or the second slave chip, and the third input selector 403 selects an output signal of the third signal receiver 300 for output.

It should be noted that the example of FIG. 10 is a combination of FIGS. 8 and 9 made by means of the third input selector 403. In some embodiments, FIGS. 7 to 9 may also be combined by means of the third input selector 403, so that the first master chip, the first slave chips, the second master chip, and the second slave chips have the same receiving structure.

Referring to FIGS. 2 to 5, in this embodiment, the number of first slave chips is equal to the number of second slave chips, the first master chip and the first slave chips are arranged in the form of a first array of 1 column and N rows, and the first master chip is arranged at the position of an Nth row; the second master chip and the second slave chips are arranged in the form of a second array of 1 column and N rows, and the second master chip is arranged at the position of an (N/2)th row; and N−1 is the number of first slave chips and second slave chips. In other embodiments, the chips may be arranged in an array of i columns and j rows according to the number of chips and a layout area to be arranged. At this time, the first master chip is arranged in the array position of a first column and a jth row, and the second master chip is arranged in the array position of an (i/2+1)th column and a (j/2)th row.

It can be understood that the number of chips in a loop varies with changes of the mode which the memory is under. In an embodiment shown in the present disclosure, in the command mode, the memory includes two calibration loops, and each calibration loop includes one master chip and N−1 slave chips; and in the background mode, the memory includes only one calibration loop, and the calibration loop includes two master chips and 2N−2 slave chips.

In some embodiments, the first master chip and the first slave chips are packaged in the same memory device, and the second master chip and the second slave chips are packaged in the same memory device. In some embodiments, the first master chip and the first slave chips are packaged in different memory devices, and the second master chip and the second slave chips are packaged in different memory devices, wherein the connection between the first transmission terminals A and the second transmission terminals B packaged in the different memory devices is set by means of wired or wireless interconnection between the memory devices.

In this embodiment, a plurality of chips calibrated by means of the first calibration interface are configured as a first master chip and a plurality of first slave chips; a plurality of chips calibrated by means of a second calibration interface are configured as a second master chip and a plurality of second slave chips; the first master chip uses a calibration resistor to perform ZQ calibration on the basis of a ZQ calibration command provided by a memory, and the second master chip uses the calibration resistor to perform ZQ calibration after a delay on the basis of the ZQ calibration command provided by the memory; after the first master chip and the second master chip use the calibration resistor to perform ZQ calibration, they send a respective ZQ flag signal to the cascaded first slave chips and second slave chips, and the cascaded first slave chips and second slave chips sequentially use the ZQ calibration resistor to perform ZQ calibration on the basis of the ZQ flag signal, so that a theoretically unlimited number of chips share the ZQ calibration resistor for ZQ calibration.

It should be noted that in this embodiment, a flag bit is used to indicate whether the loop, where a master chip is located, is in a ZQ calibration state or not. Specifically, when the master chip receives the ZQ calibration command or receives the ZQ flag signal for the first time, the flag bit is in a first state. Accordingly, after the master chip that the flag bit is in the first state receives the ZQ flag signal, the flag bit is in a second state. In addition, in the case that the ZQ calibration time is limited, the chips sharing the ZQ calibration resistor are also limited. The longer the time required for each chip to perform ZQ calibration, the less the number of chips that share the ZQ calibration resistor. Further, the features disclosed in the memory devices provided in the above embodiments may be combined arbitrarily without conflict, so that new embodiments of the memory devices may be obtained.

Another embodiment of the present disclosure provides a ZQ calibration method, which is applied to the memory device provided in the above embodiments, so that a theoretically unlimited number of chips share the ZQ calibration resistor for ZQ calibration.

Figure 11:
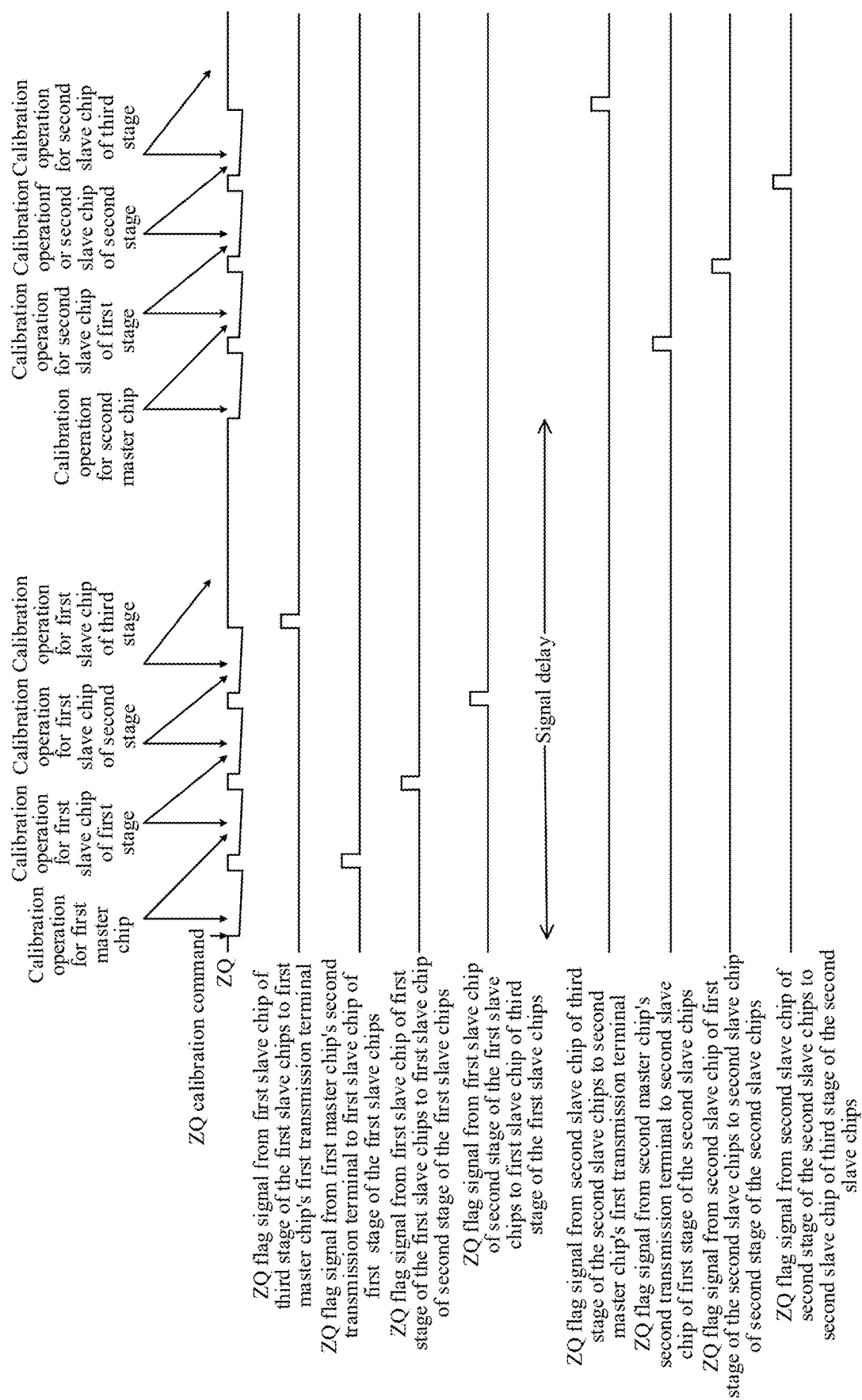
FIG. 11 is timing and schematic diagrams corresponding to a ZQ calibration method of a memory device provided in another embodiment of the present disclosure when it is in a command mode.
Figure 12:
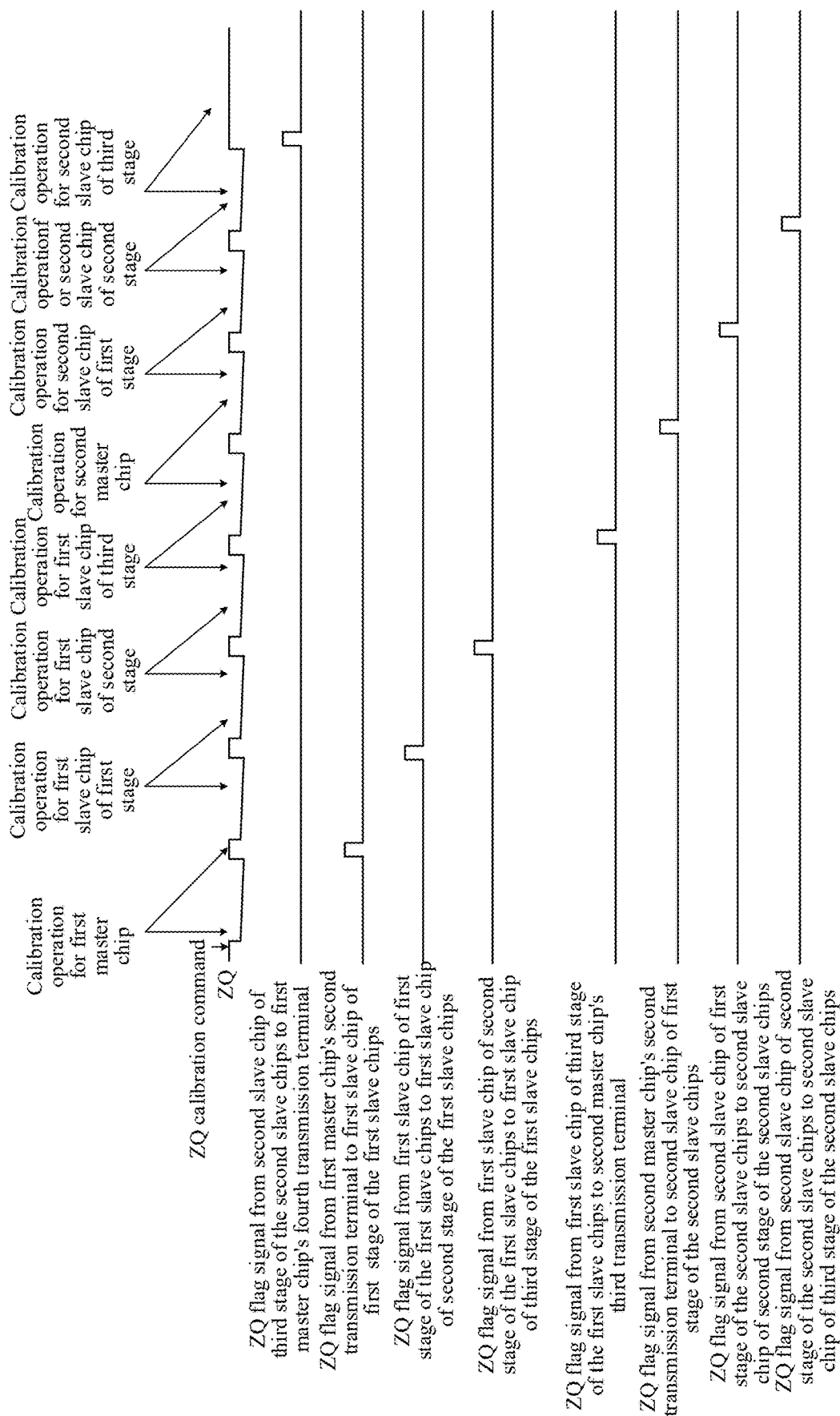
FIG. 12 is timing and schematic diagrams corresponding to a ZQ calibration method of the memory device provided in another embodiment of the present disclosure when it is in a background mode.

FIG. 11 is timing and schematic diagrams corresponding to a ZQ calibration method of a memory device provided in this embodiment when the memory device is in a command mode; and FIG. 12 is timing and schematic diagrams corresponding to a ZQ calibration method of the memory device provided in this embodiment when the memory device is in a background mode. The ZQ calibration method provided in this embodiment will be described in detail below with reference to the figures, which is specifically as follows:

Referring to FIG. 11, a ZQ calibration method includes: in a command mode, obtaining, in a command mode, a ZQ calibration command externally applied to the memory device; in response to the ZQ calibration command, performing a first type of calibration operation on a first master chip; after the first type of calibration operation is completed, transmitting a type of ZQ flag signal to a first slave chip of a first stage of a plurality of stages of cascaded first slave chips, and at a same time, performing a second type of calibration operation on the first master chip; in response to the type of ZQ flag signal, performing the first type of calibration operation on the first slave chip of the first stage of the plurality of stages of cascaded first slave chips; after the first type of calibration operation on the first slave chip of the first stage is completed, transmitting the type of ZQ flag signal to a first slave chip of a next stage of the plurality of stages of cascaded first slave chips, and at a same time, performing the second type of calibration operation on the first slave chip of the first stage of the plurality of stages of cascaded first slave chips, until the first type of calibration operation of a first slave chip of a last stage of the plurality of stages of cascaded first slave chips is completed; completing the second type of calibration operation on the first slave chip of the last stage of the plurality of stages of cascaded first slave chips; in response to a delayed the ZQ calibration command, performing the first type of calibration operation on a second master chip; after the first type of calibration operation is completed, transmitting the type of ZQ flag signal to a second slave chip of a first stage of the plurality of stages of cascaded second slave chips, and at a same time, performing the second type of calibration operation on the second master chip; in response to the type of ZQ flag signal, performing the first type of calibration operation on the second slave chip of the first stage of the plurality of stages of cascaded second slave chips; after the first type of calibration operation on the second slave chip of the first stage is completed, transmitting the type of ZQ flag signal to a second slave chip of a next stage of the plurality of stages of cascaded second slave chips, and at a same time, performing the second type of calibration operation on the second slave chip of the first stage of the plurality of stages of cascaded second slave chips, until the first type of calibration operation of a second slave chip of a last stage of the plurality of stages of cascaded second slave chips is completed; completing the second type of calibration operation on the second slave chip of the last stage of the plurality of stages of cascaded second slave chips.

It should be noted that the ZQ calibration timing diagram shown in FIG. 11 is illustrated by using three stages of slave chips, which is only for a person skilled in the art to know the implementation of the ZQ calibration in the embodiment of the present disclosure, and not to constitute the limitation of this embodiment. On the basis of the illustration in FIG. 11 and the ZQ calibration method mentioned above, a person skilled in the art can continue to extend the timing sequence in FIG. 11 to the situation applicable to K number of first slave chips and second slave chips.

In some embodiments, while completing the second calibration operation on the first slave chip of the last stage, the ZQ calibration method further comprises transmitting the ZQ flag signal to the first master chip; and while completing the second calibration operation on the second slave chip of the last stage, the ZQ calibration method further comprises transmitting the ZQ flag signal to the second master chip. When the first master chip receives the ZQ flag signal, it is demonstrated that all the first salve chips have completed ZQ calibration; and when the second master chip receives the ZQ flag signal, it is demonstrated that all the second slave chips have completed ZQ calibration, and the memory can perform a next operation. The ZQ flag signal is returned from the slave chip of the last stage to the master chip, prompting that all the chips have completed ZQ calibration, and facilitating the design of memory circuits and signal timing.

Referring to FIG. 12, the ZQ calibration method further includes: in a background mode, in response to the ZQ calibration command, performing the first type of calibration operation on the first master chip; after the first type of calibration operation is completed, transmitting the type of ZQ flag signal to a first slave chip of a first stage of a plurality of stages of cascaded first slave chips, and at a same time, performing the second type of calibration operation on the first master chip; in response to the type of ZQ flag signal, performing the first type of calibration operation on the first slave chip of the first stage of the plurality of stages of cascaded first slave chips; after the first type of calibration operation on the first slave chip of the first stage is completed, transmitting the type of ZQ flag signal to a first slave chip of a next stage of the plurality of stages of cascaded first slave chips, and at a same time, performing the second type of calibration operation on the first slave chip of the first stage of the plurality of stages of cascaded first slave chips, until the first type of calibration operation of a first slave chip of a last stage of the plurality of stages of cascaded first slave chips is completed; transmitting the type of ZQ flag signal to the second master chip, and at a same time, performing the second type of calibration operation on the first slave chip of the last stage of the plurality of stages of cascaded first slave chips; in response to the type of ZQ flag signal, performing the first type of calibration operation on the second master chip; after the first type of calibration operation is completed, transmitting the type of ZQ flag signal to a second slave chip of a first stage of the plurality of stages of cascaded second slave chips, and at a same time, performing the second type of calibration operation on the second master chip; in response to the type of ZQ flag signal, performing the first type of calibration operation on the second slave chip of the first stage of the plurality of stages of cascaded second slave chips; after the first type of calibration operation on the second slave chip of the first stage is completed, transmitting the type of ZQ flag signal to a second slave chip of a next stage of the plurality of stages of cascaded second slave chips, and at a same time, performing the second type of calibration operation on the second slave chip of the first stage of the plurality of stages of cascaded second slave chips, until the first type of calibration operation of a second slave chip of a last stage of the plurality of stages of cascaded second slave chips is completed; completing the second type of calibration operation on the second slave chip of the last stage of the plurality of stages of cascaded second slave chips.

It should be noted that the ZQ calibration timing diagram shown in FIG. 12 is illustrated by using three stages of slave chips, which is only for a person skilled in the art to know the implementation of the ZQ calibration in the embodiment of the present disclosure, and not to constitute the limitation of this embodiment. On the basis of the illustration in FIG. 12 and the ZQ calibration method mentioned above, a person skilled in the art can continue to extend the timing sequence in FIG. 12 to the situation applicable to K first slave chips and second slave chips.

In some embodiments, in the background mode, in the background mode, while completing the second type of calibration operation on the second slave chip of the last stage of the plurality of stages of cascaded second slave chips, the ZQ calibration method further comprises transmitting the type of ZQ flag signal to the first master chip. When the first master chip receives the ZQ flag signal, it is demonstrated that all chips have completed ZQ calibration, and the memory may perform the next operation. The ZQ flag signal is returned from the slave chip of the last stage to the master chip, prompting that all the chips have completed ZQ calibration, and facilitating the design of memory circuits and signal timing.

It should be noted that in this embodiment, the first calibration operation is one of a pull-up calibration operation for generating a pull-up calibration code and a pull-down calibration operation for generating a pull-down calibration code, and the second calibration operation is the other of the pull-up calibration operation and the pull-down calibration operation. The first calibration operation needs to use the calibration resistor to perform calibration, and the second calibration operation performs calibration on the basis of the results of the first calibration operation without using the calibration resistor. In addition, the features disclosed in the ZQ calibration methods provided in the above embodiments may be combined arbitrarily without conflict, so that new embodiments of the ZQ calibration methods may be obtained.

The embodiments or implementations of the present specification are described in a progressive manner, each embodiment focuses on the difference from other embodiments, and the same and similar parts of the embodiments can be referred to each other.

In the description of the present specification, the description with reference to the terms "embodiments", "exemplary embodiments", "some implementations", "exemplary implementation", "examples,", etc., means that the specific features, structures, materials, or features described in combination with the implementations or examples are included in at least one implementation or example of the present disclosure.

In the present specification, schematic representations of the above terms do not necessarily refer to the same implementation or example. Moreover, the specific features, structures, materials, or features described may be combined in any one or more implementations or examples in a suitable manner.

In the description of the present disclosure, it should be noted that the orientation or positional relationships indicated by the terms "center", "upper", "lower", "left", "right", "vertical", "horizontal", "inner", "outer", etc. are based on the orientation or positional relationships shown in the drawings, which are only for the convenience of describing the present disclosure and simplifying the description, rather than indicating or implying that the device or element referred to must have a specific orientation and be constructed and operated in a specific orientation, and therefore cannot be understood as limiting the present disclosure.

It can be understood that the terms 'first', 'second', etc. used in the present disclosure may be used to describe various structures in the present disclosure, but the structures are not limited by these terms. These terms are used only to distinguish a first structure from another structure.

In one or more figures, the same elements are represented by like reference signs. For the sake of clarity, a plurality of parts in the figures are not drawn to scale. Further, certain well-known portions may not be shown. For the sake of brevity, a structure obtained after several steps may be described in one figure. Many specific details of the present disclosure are described hereinafter, such as structures, materials, sizes, processing processes, and techniques of the devices, so as to more clearly understand the present disclosure. However, as can be understood by a person skilled in the art, the present disclosure may not be implemented according to these specific details.

It should be finally noted that the above embodiments are used to illustrate the technical solution of the present disclosure only, and not to limit the present disclosure. Although the present disclosure has been described in detail with reference to the foregoing embodiments, it should be understood by a person skilled in the art that the technical solutions described in the foregoing embodiments can still be modified, or some or all of the technical features therein can be equivalently replaced. Moreover, these modifications or replacements do not make the essence of the corresponding technical solutions depart from the scope of the technical solutions of the embodiments of the present disclosure.

In a memory device and a ZQ calibration method provided in the embodiments of the present disclosure, a plurality of chips calibrated by means of a first calibration interface are configured as a first master chip and a plurality of first slave chips; a plurality of chips calibrated by means of a second calibration interface are configured as a second master chip and a plurality of second slave chips; the first master chip uses a calibration resistor to perform ZQ calibration on the basis of a ZQ calibration command provided by a memory, and the second master chip uses the calibration resistor to perform ZQ calibration after a certain delay on the basis of the ZQ calibration command provided by the memory; after the first master chip and the second master chip use the calibration resistor to perform ZQ calibration, they send a ZQ flag signal to the cascaded first slave chips and second slave chips, and the cascaded first slave chips and second slave chips sequentially use the ZQ calibration resistor to perform ZQ calibration on the basis of the ZQ flag signal, so that a theoretically unlimited number of chips share the ZQ calibration resistor for ZQ calibration.

The invention claimed is:

1. A memory device, comprising:
two calibration resistor interfaces, the two calibration resistor interfaces being connected to a same ZQ calibration resistor,
wherein a first master chip, a plurality of stages of cascaded first slave chips, a second master chip, and a plurality of stages of cascaded second slave chips are commonly connected to the ZQ calibration resistor,
wherein each of the first master chip, the first slave chips, the second master chip, and the second slave chips is provided with a first transmission terminal and a second transmission terminal, and each of the second transmission terminals is used to transmit a ZQ flag signal,
wherein the second transmission terminal of the first master chip is connected to the first transmission terminal of a first slave chip of a first stage of the plurality of stages of cascaded first slave chips, a second transmission terminal of a first slave chip of each stage of the plurality of stages of cascaded first slave chips is connected to a first transmission terminal of a first slave chip of a next stage of the plurality of stages of cascaded first slave chips, the second transmission terminal of the second master chip is connected to the first transmission terminal of a second slave chip of a first stage of the plurality of stages of cascaded second slave chips, and a second transmission terminal of a second slave chip of each stage of the plurality of stages of cascaded second slave chips is connected to a first transmission terminal of a second slave chip of a next stage of the plurality of stages of cascaded second slave chips,
wherein the first master chip is provided with a first signal receiver, the second master chip is provided with a second signal receiver, and each of the first slave chips and the second slave chips is provided with a respective third signal receiver,
wherein, in a command mode, the first signal receiver is used to receive, at a first ZQ signal terminal, a ZQ calibration command provided by a memory, the second signal receiver is used to receive and delay the ZQ calibration command by a second ZQ signal terminal, the first master chip and the second master chip start to calibrate based on the ZQ calibration command, and the first master chip and the second master chip send their respective the ZQ flag signals by their-the second transmission terminals in response to the calibration of the first and second master chips being completed, respectively, the respective ZQ flag signal indicating that a current chip has been calibrated with the calibration resistor, and wherein the third signal receiver of each of the first and second slave chips is used to receive a respective ZQ flag signal received by the first transmission terminal of its respective chip, each of the first slave chips and the second slave chips starts to calibrate based on the respective ZQ flag signal, and each of the first slave chips and the second slave chips sends a respective ZQ flag signal by its respective second transmission terminal in response to a respective ZQ calibration operation being completed until all the first or second slave chips have been calibrated.

2. The memory device according to claim 1, wherein:
a second transmission terminal of a first slave chip of a last stage of the plurality of stages of cascaded first slave chips is connected to the first transmission terminal of the first master chip; and
a second transmission terminal of a second slave chip of a last stage of the plurality of stages of cascaded second slave chips is connected to the first transmission terminal of the second master chip.

3. The memory device according to claim 2, wherein
the second master chip further comprises a third transmission terminal, the third transmission terminal is turned on in a background mode for receiving the ZQ flag signal, and the third transmission terminal is connected to the second transmission terminal of the first slave chip of the last stage of the plurality of stages of cascaded first slave chips;
in the background mode, the first signal receiver is used to receive, at the first ZQ signal terminal, a clock signal or power-on signal provided by the memory, the first master chip starts to calibrate based on the clock signal or power-on signal, and the first master chip sends a ZQ flag signal by the second transmission terminal in response to the calibration of the first master chips being completed; and
each of the first slave chips, the second master chip, and the second slave chips sequentially start to calibrate based on a respective ZQ flag signal.

4. The memory device according to claim 3, wherein the first master chip further comprises a fourth transmission terminal, the fourth transmission terminal is turned on in the background mode for transmitting the ZQ flag signal, and the fourth transmission terminal is connected to the second transmission terminal of the second slave chip of the last stage of the plurality of stages of cascaded second slave chips.

5. The memory device according to claim 3, wherein
the first signal receiver comprises:
a first AND gate, one input terminal of which is used to receive the ZQ calibration command, and the other input terminal of which is used to receive a first command indication signal for indicating that the memory is working in the command mode;
a second AND gate, one input terminal of which is used to receive a clock signal or a power-on signal, and the other input terminal of which is used to receive a first background indication signal for indicating that the memory is working in the background mode; and
a first input selector, a first input terminal of which is connected to an output terminal of the first AND gate, a second input terminal of which is connected to an output terminal of the second AND gate, a first selection terminal of which is used to receive a second command indication signal or a second background indication signal, and a first output terminal of which is used to output a first internal calibration signal for instructing the first master chip and the second master chip to perform calibration; wherein the first input selector is configured to connect the first input terminal to the first output terminal based on the second command indication signal, or to connect the second input terminal to the first output terminal based on the second background indication signal;

the second signal receiver comprises:
a third AND gate, one input terminal of which is used to receive and delay the ZQ calibration command, and the other input terminal of which is used to receive the first command indication signal;
a fourth AND gate, one input terminal of which is used to receive the ZQ flag signal, and the other input terminal of which is used to receive the first background indication signal; and
a second input selector, a third input terminal of which is connected to an output terminal of the third AND gate, a fourth input terminal of which is connected to an output terminal of the fourth AND gate, a second selection terminal of which is used to receive the second command indication signal or the second background indication signal, and a second output terminal of which is used to output the first internal calibration signal; wherein the first input selector is configured to connect the third input terminal to the second output terminal based on the second command indication signal, or to connect the fourth input terminal to the second output terminal based on the second background indication signal;

the third signal receiver comprises:
a fifth AND gate, one input terminal of which is used to receive the ZQ flag signal, the other input terminal of which is used to receive a first indication signal for indicating that a current chip is the first slave chip or the second slave chip, and an output terminal of which is used to output a second internal calibration signal for instructing the first slave chip and the second slave chip to perform calibration.

6. The memory device according to claim 5, wherein
the first master chip and the second master chip further comprise a third signal receiver, and the slave chips further comprise a first signal receiver and/or a second signal receiver;
the first master chip, the first slave chips, the second master chip, and the second slave chips further comprise:
a third input selector, a fifth input terminal of which is used to receive the first internal calibration command, a sixth input terminal of which is used to receive the second internal calibration command, a third selection terminal of which is used to receive the first indication signal or a second indication signal, the second indication signal being used for indicating that a current chip is the first master chip or the second master chip, and a third output terminal of which is used to output the first internal calibration command and the second internal calibration command; wherein the third input selector is configured to connect the sixth input terminal to the third output terminal based on the first indication signal, or to connect the fifth input terminal to the third output terminal based on the second indication signal.

7. The memory device according to claim 3, wherein
the first signal receiver and the second signal receiver comprise:

a first selector, one input terminal of which is used to receive the ZQ calibration command, the other input terminal of which is used to receive a delayed ZQ calibration command, and a selection terminal of which is used to receive a first master chip identification signal or a second master chip identification signal; wherein the first selector is configured to output the ZQ calibration command based on the first master chip identification signal, or to output the delayed ZQ calibration command based on the second master chip identification signal;

a first AND gate, one input terminal of which is connected to an output terminal of the first selector, and the other input terminal of which is used to receive a first command indication signal for indicating that the memory is working in the command mode;

a second selector, one input terminal of which is used to receive a clock signal or a power-on signal, the other input terminal of which is used to receive the ZQ flag signal transmitted through the third transmission terminal, and a selection terminal of which is used to receive the first master chip identification signal or the second master chip identification signal; wherein the second selector is configured to output the clock signal or the power-on signal based on the first master chip identification signal, or to output the ZQ flag signal based on the second master chip identification signal;

a second AND gate, one input terminal of which is connected to an output terminal of the second selector, and the other input terminal of which is used to receive a first background indication signal for indicating that the memory is working in the background mode;

a first input selector, a first input terminal of which is connected to an output terminal of the first AND gate, a second input terminal of which is connected to an output terminal of the second AND gate, a first selection terminal of which is used to receive a second command indication signal or a second background indication signal, and a first output terminal of which is used to output a first internal calibration signal for instructing the first master chip and the second master chip to perform calibration; wherein the first input selector is configured to connect the first input terminal to the first output terminal based on the second command indication signal, or to connect the second input terminal to the first output terminal based on the second background indication signal;

the third signal receiver comprises:

a fifth AND gate, one input terminal of which is used to receive the ZQ flag signal, the other input terminal of which is used to receive a first indication signal for indicating that a current chip is the first slave chip or the second slave chip, and an output terminal of which is used to output a second internal calibration signal for instructing the first slave chip or the second slave chip to perform calibration.

8. The memory device according to claim 7, wherein the first master chip and the second master chip further comprise a third signal receiver, and the slave chips further comprise a first signal receiver and/or a second signal receiver;

the first master chip, the first slave chips, the second master chip, and the second slave chips further comprise:

a third input selector, a fifth input terminal of which is used to receive the first internal calibration command, a sixth input terminal of which is used to receive the second internal calibration command, a third selection terminal of which is used to receive the first indication signal or a second indication signal, the second indication signal being used for indicating that a current chip is the first master chip or the second master chip, and a third output terminal of which is used to output the first internal calibration command and the second internal calibration command; wherein the third input selector is configured to connect the sixth input terminal to the third output terminal based on the first indication signal, or to connect the fifth input terminal to the third output terminal based on the second indication signal.

9. The memory device according to claim 1, wherein the first master chip, the first slave chips, the second master chips, and the second slave chips are packaged in the same memory device.

10. The memory device according to claim 1, wherein:

the first master chip and the first slave chips are packaged in different memory devices;

the second master chip and the second slave chips are packaged in different memory devices, wherein connection between the first transmission terminals and the second transmission terminals packaged in the different memory devices is set by wired or wireless interconnection between the memory devices.

11. The memory device according to claim 1, wherein:

a number of the second slave chips is equal to a number of the first slave chips;

the first master chip and the first slave chips are arranged in a form of a first array of 1 column and N rows, and the first master chip is arranged at a position of an Nth row; and the second master chip and the second slave chips are arranged in a form of a second array of 1 column and N rows, and the first master chip is arranged at a position of an (N/2)th row, wherein N−1 is the number of the first slave chips.

12. A ZQ calibration method, performed by a memory device, comprising:

obtaining, in a command mode, a ZQ calibration command externally applied to the memory device;

in response to the ZQ calibration command, performing a first type of calibration operation on a first master chip;

after the first type of calibration operation is completed, transmitting a type of ZQ flag signal to a first slave chip of a first stage of a plurality of stages of cascaded first slave chips, and at a same time, performing a second type of calibration operation on the first master chip;

in response to the type of ZQ flag signal, performing the first type of calibration operation on the first slave chip of the first stage of the plurality of stages of cascaded first slave chips;

after the first type of calibration operation on the first slave chip of the first stage is completed, transmitting the type of ZQ flag signal to a first slave chip of a next stage of the plurality of stages of cascaded first slave chips, and at a same time, performing the second type of calibration operation on the first slave chip of the first stage of the plurality of stages of cascaded first slave chips, until the first type of calibration operation of a first slave chip of a last stage of the plurality of stages of cascaded first slave chips is completed;

completing the second type of calibration operation on the first slave chip of the last stage of the plurality of stages of cascaded first slave chips;

in response to delaying a delayed the ZQ calibration command, performing the first type of calibration operation on a second master chip;

after the first type of calibration operation on the second master chip is completed, transmitting the type of ZQ flag signal to a second slave chip of a first stage of the plurality of stages of cascaded second slave chips, and at a same time, performing the second type of calibration operation on the second master chip;

in response to the type of ZQ flag signal, performing the first type of calibration operation on the second slave chip of the first stage of the plurality of stages of cascaded second slave chips;

after the first type of calibration operation on the second slave chip of the first stage is completed, transmitting the type of ZQ flag signal to a second slave chip of a next stage of the plurality of stages of cascaded second slave chips, and at a same time, performing the second type of calibration operation on the second slave chip of the first stage of the plurality of stages of cascaded second slave chips, until the first type of calibration operation of a second slave chip of a last stage of the plurality of stages of cascaded second slave chips is completed; and completing the second type of calibration operation on the second slave chip of the last stage of the plurality of stages of cascaded second slave chips.

13. The ZQ calibration method according to claim 12, wherein
while completing the second type of calibration operation on the first slave chip of the last stage of the plurality of stages of cascaded first slave chips, the ZQ calibration method further comprises transmitting the type of ZQ flag signal to the first master chip; and
while completing the second type of calibration operation on the second slave chip of the last stage of the plurality of stages of cascaded second slave chips, the ZQ calibration method further comprises: transmitting the type of ZQ flag signal to the second master chip.

14. The ZQ calibration method according to claim 12, wherein the ZQ calibration method comprises:
in a background mode, in response to the ZQ calibration command, performing the first type of calibration operation on the first master chip;
after the first type of calibration operation is completed, transmitting the type of ZQ flag signal to a first slave chip of a first stage of a plurality of stages of cascaded first slave chips, and at a same time, performing the second type of calibration operation on the first master chip;
in response to the type of ZQ flag signal, performing the first type of calibration operation on the first slave chip of the first stage of the plurality of stages of cascaded first slave chips;
after the first type of calibration operation on the first slave chip of the first stage is completed, transmitting the type of ZQ flag signal to a first slave chip of a next stage of the plurality of stages of cascaded first slave chips, and at a same time, performing the second type of calibration operation on the first slave chip of the first stage of the plurality of stages of cascaded first slave chips, until the first type of calibration operation of a first slave chip of a last stage of the plurality of stages of cascaded first slave chips is completed;

transmitting the type of ZQ flag signal to the second master chip, and at a same time, performing the second type of calibration operation on the first slave chip of the last stage of the plurality of stages of cascaded first slave chips;

in response to the type of ZQ flag signal, performing the first type of calibration operation on the second master chip;

after the first type of calibration operation is completed, transmitting ZQ the type of flag signal to a second slave chip of a first stage of the plurality of stages of cascaded second slave chips, and at a same time, performing the second type of calibration operation on the second master chip;

in response to the type of ZQ flag signal, performing the first type of calibration operation on the second slave chip of the first stage of the plurality of stages of cascaded second slave chips;

after the first type of calibration operation on the second slave chip of the first stage is completed, transmitting the type of ZQ flag signal to a second slave chip of a next stage of the plurality of stages of cascaded second slave chips, and at a same time, performing the second type of calibration operation on the second slave chip of the first stage of the plurality of stages of cascaded second slave chips, until the first type of calibration operation of a second slave chip of a last stage of the plurality of stages of cascaded second slave chips is completed;

completing the second type of calibration operation on the second slave chip of the last stage of the plurality of stages of cascaded second slave chips.

15. The ZQ calibration method according to claim 14, wherein in the background mode, while completing the second type of calibration operation on the second slave chip of the last stage of the plurality of stages of cascaded second slave chips, the ZQ calibration method further comprises transmitting the type of ZQ flag signal to the first master chip.

16. The ZQ calibration method according to claim 14, wherein the first type of calibration operation is one of a pull-up calibration operation for generating a pull-up calibration code and a pull-down calibration operation for generating a pull-down calibration code, and the second type of calibration operation is the other of the pull-up calibration operation and the pull-down calibration operation.

17. The ZQ calibration method according to claim 12, wherein the first type of calibration operation is one of a pull-up calibration operation for generating a pull-up calibration code and a pull-down calibration operation for generating a pull-down calibration code, and the second type of calibration operation is the other of the pull-up calibration operation and the pull-down calibration operation.

* * * * *